(12) United States Patent
Feng et al.

(10) Patent No.: US 7,599,424 B1
(45) Date of Patent: *Oct. 6, 2009

(54) ANTENNA DIVERSITY TECHNIQUE FOR WIRELESS COMMUNICATION

(75) Inventors: Weishi Feng, San Jose, CA (US); Hsiao Tang, San Jose, CA (US); Guorong Hu, Sunnyvale, CA (US); Yungping Hsu, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 12/231,341

(22) Filed: Sep. 2, 2008

Related U.S. Application Data

(63) Continuation of application No. 11/449,956, filed on Jun. 9, 2006, now Pat. No. 7,421,012, which is a continuation of application No. 09/991,473, filed on Nov. 16, 2001, now Pat. No. 7,099,380.

(51) Int. Cl.
*H04B 1/707* (2006.01)
*H04B 7/10* (2006.01)
(52) U.S. Cl. .................. 375/148; 375/150; 375/347
(58) Field of Classification Search ............ 375/142, 375/144, 148, 150, 267, 343, 347, 367
See application file for complete search history.

(56) References Cited

U.S. PATENT DOCUMENTS

| 4,237,903 A | 12/1980 | Hofmann |
| 5,077,753 A | 12/1991 | Grau, Jr. et al. |
| 5,838,742 A | 11/1998 | Abu-Dayya |
| 5,950,124 A | 9/1999 | Trompower et al. |
| 6,061,574 A | 5/2000 | Goldberg |
| 6,115,406 A | 9/2000 | Mesecher |
| 6,215,812 B1 | 4/2001 | Young et al. |
| 6,215,814 B1 | 4/2001 | Yitalo et al. |
| 6,229,842 B1 | 5/2001 | Schulist et al. |
| 6,240,149 B1 | 5/2001 | Yukitomo et al. |
| 6,256,340 B1 | 7/2001 | Schilling |
| 6,259,721 B1 | 7/2001 | Uesugi et al. |

(Continued)

FOREIGN PATENT DOCUMENTS

EP 0642 243 A1 4/1993

OTHER PUBLICATIONS

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; 528 pages.

(Continued)

*Primary Examiner*—Don N Vo

(57) ABSTRACT

A receiver includes a demodulator that receives data packets each having a preamble and that generates spreading codewords by correlating a spreading code with the preambles of the data packets. A signal quality device determines signal quality values at a plurality of antennas for each of the data packets after correlation with corresponding ones of the spreading codes and selects one of the plurality of antennas based on the signal quality values. Each of the signal quality values includes a peak-to-average ratio value.

19 Claims, 10 Drawing Sheets

U.S. PATENT DOCUMENTS

| | | | |
|---|---|---|---|
| 6,278,726 | B1 | 8/2001 | Mesecher et al. |
| 6,609,012 | B1 | 8/2003 | Malmgren et al. |
| 6,683,908 | B1 | 1/2004 | Cleveland |
| 6,728,306 | B1 | 4/2004 | Shi |
| 6,754,195 | B2 | 6/2004 | Webster et al. |
| 6,771,772 | B1 | 8/2004 | Tannikulu |
| 6,882,679 | B2 | 4/2005 | Somayazulu et al. |
| 7,099,380 | B1 | 8/2006 | Feng et al. |
| 7,271,765 | B2 | 9/2007 | Stilp et al. |
| 7,356,072 | B1 | 4/2008 | Feng et al. |
| 7,421,012 | B1 | 9/2008 | Feng et al. |
| 2002/0090024 | A1 | 7/2002 | Tan |
| 2003/0086507 | A1 | 5/2003 | Kim et al. |

OTHER PUBLICATIONS

Fennick, J.; "The PAR Meter: Applications in Telecommunication Systems"; IEEE Transactions on Communications Technology; vol. 18, No. 1; Feb. 1970; pp. 68-73.

Hettich, A; "IEEE 802.11 or ETSI BRAN HIPERLAN/2: Who will win the race for a high speed wireless LAN standard?"; pp. 1-6.

IEEE Std 802.11b-1999 (Supplement to IEEE Std 802.11-1999 Edition); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.

Jones et al; Block coding for reduction of Peak to mean envelope power ratio of multicarrier transmission schemes; Electronics Letters; vol. 30, No. 25; Dec. 1994; pp. 2098-2099.

Liu et al; "Advanced low-complexity HIPERLAN receiver using combined antenna diversity and simple equalizer"; IEEE 47th Vehicular Technology Conference, vol. 3; May 4-7, 1997; pp. 2037-2041).

Ramasami; "Orthogonal Frequency Division Multiplexing"; http://www.ittc.ku.edu/~rvc/documents/862/862_ofdmreport.pdf; pp. 1-27.

Sarinnapakorn, K.; "IEEE 802.11b High Rate Wireless Local Area Networks"; http://alpha.fdu.edu/~kanoksri/IEEE80211b.html; Mar. 15, 2001; pp. 1-8.

Srivastava et al; "A Systematic Approach to Peak-to-Average Power Ratio in OFDM"; http://fleece.ucsd.edu/~curts/papers/SPIE01.pdf; Oct. 22, 2001; pp. 1-11.

Tarokh et al; On the Computation and Reduction of the Peak-to-Average Power Ratio in Multicarrier Communications; IEEE Transactions on Communications: vol. 48, No. 1; Jan. 2000; pp. 37-44.

USPTO Non-Final Office Action mailed May 3, 2005 for U.S. Appl. No. 09/991,473, filed Nov. 1, 2001.

Amendment filed Jul. 29, 2005 in response to USPTO Non-Final Office Action mailed May 3, 2005 for U.S. Appl. No. 09/991,473, filed Nov. 1, 2001.

USPTO Non-Final Office Action mailed Oct. 28, 2005 for U.S. Appl. No. 09/991,473, filed Nov. 1, 2001.

Response filed Jan. 6, 2006 in response to USPTO Non-Final Office Action mailed Oct. 28, 2005 for U.S. Appl. No. 09/991,473, filed Nov. 1, 2001.

USPTO Non-Final Office Action mailed Dec. 27, 2006 for U.S. Appl. No. 11/449,956, filed Jun. 9, 2006.

Amendment filed Mar. 27, 2007 in response to USPTO Non-Final Office Action mailed Dec. 27, 2006 for U.S. Appl. No. 11/449,956, filed Jun. 9, 2006.

USPTO Final Office Action mailed Jul. 6, 2007 for U.S. Appl. No. 11/449,956, filed Jun. 9, 2006.

Amendment filed Aug. 29, 2007 in response to USPTO Final Office Action mailed Jul. 6, 2006 for U.S. Appl. No. 11/449,956, filed Jun. 9, 2006.

USPTO Non-Final Office Action mailed Nov. 15, 2007 for U.S. Appl. No. 11/449,956, filed Jun. 9, 2006.

Amendment filed Feb. 14, 2008 in response to USPTO Non-Final Office Action mailed Nov. 15, 2007 for U.S. Appl. No. 11/449,956, filed Jun. 9, 2006.

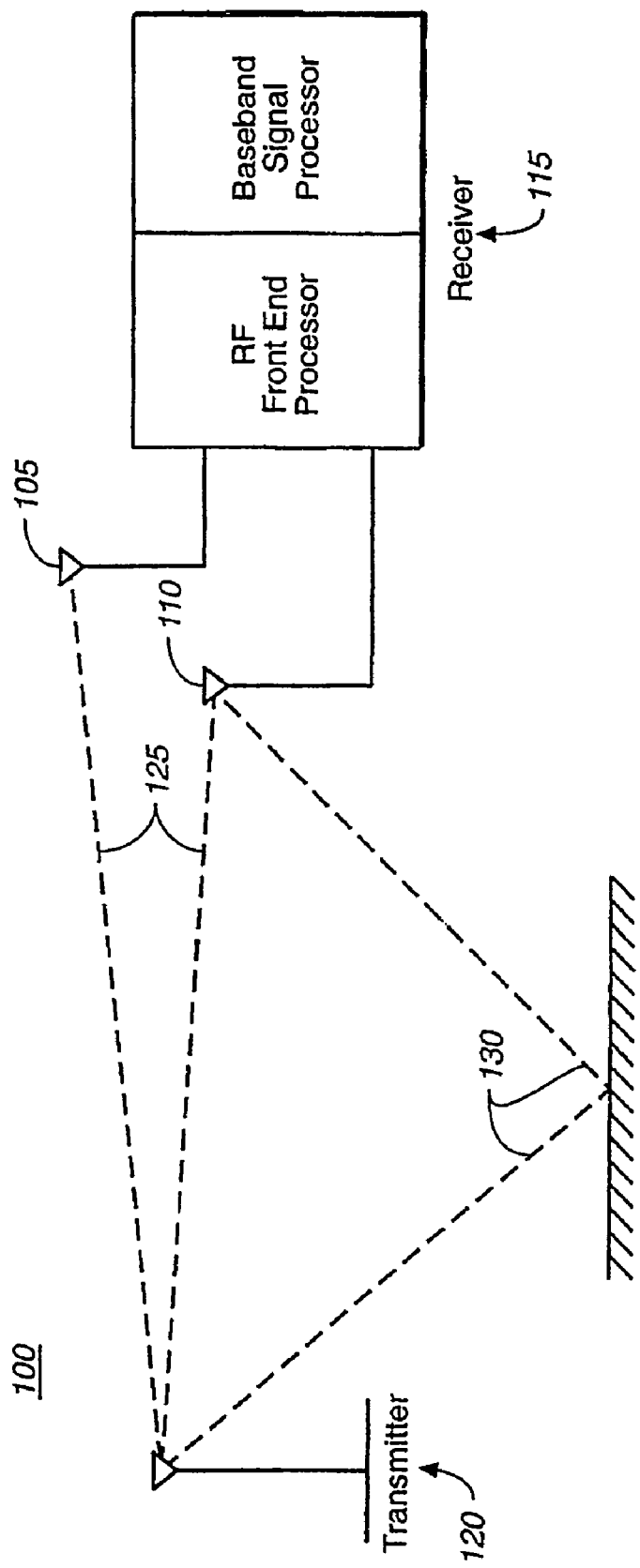
FIG._1 (PRIOR ART)

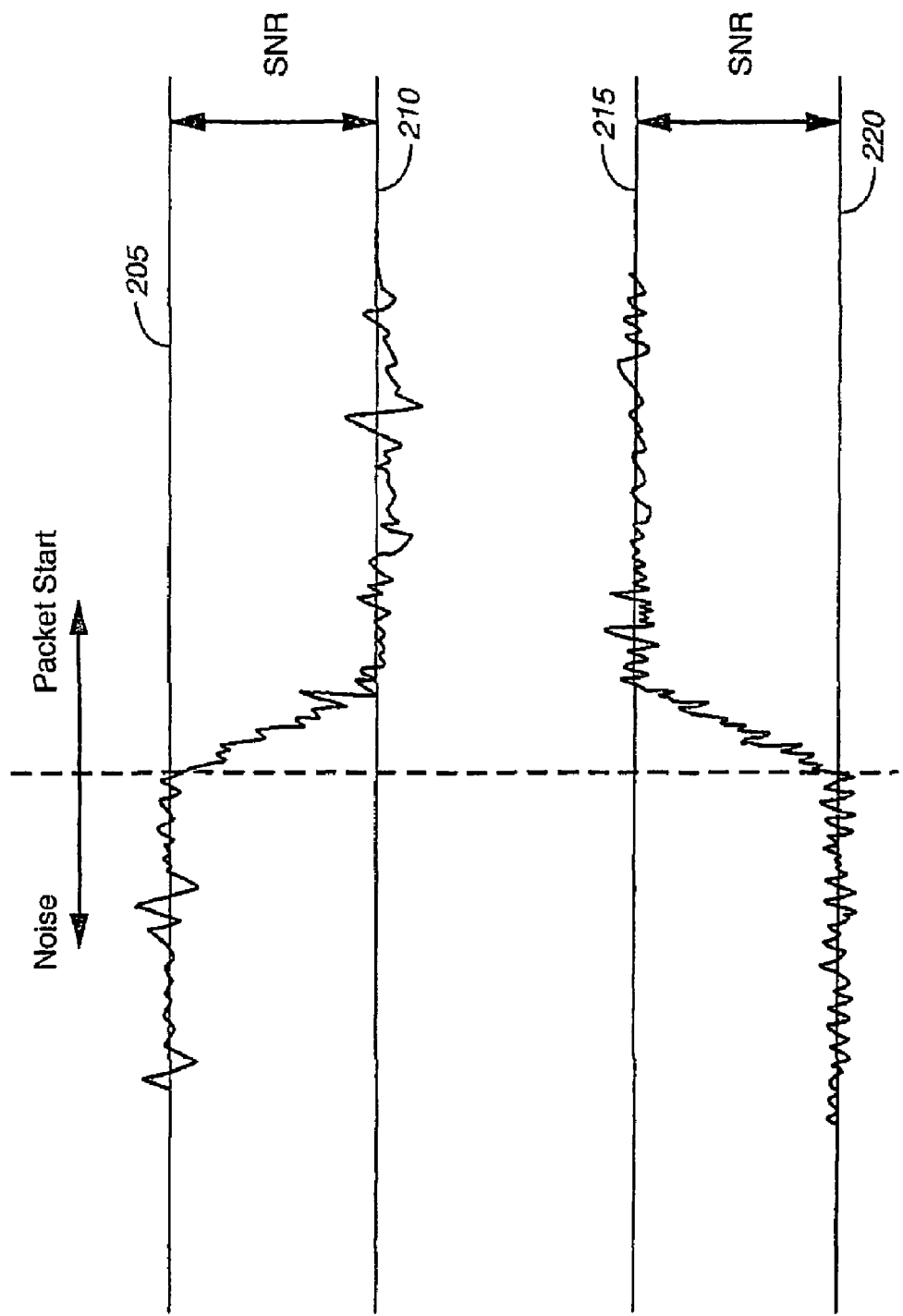
FIG._2 (PRIOR ART)

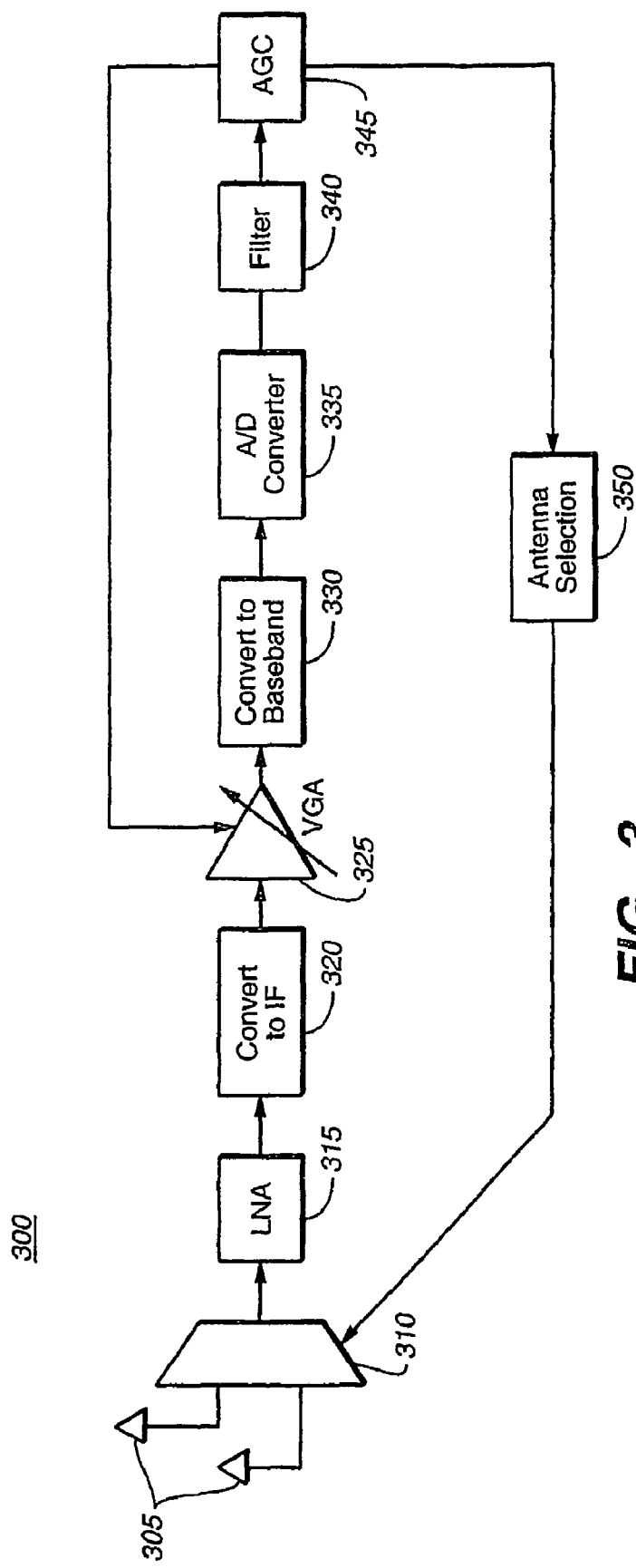
FIG._3
(PRIOR ART)

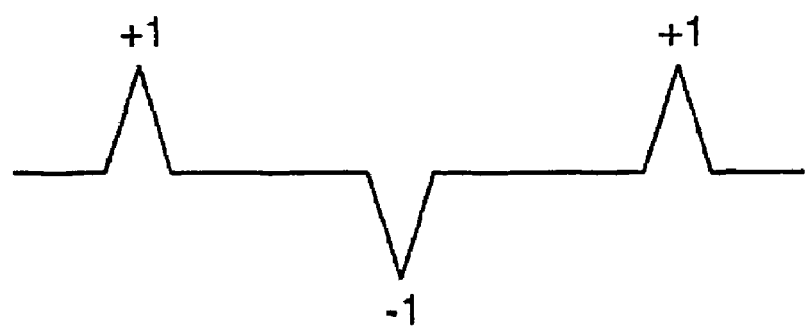
FIG._4
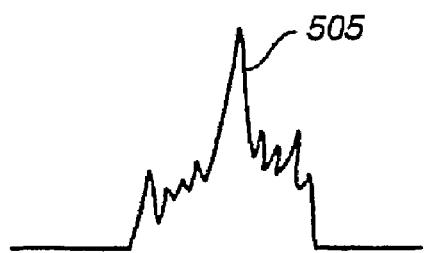
FIG._5
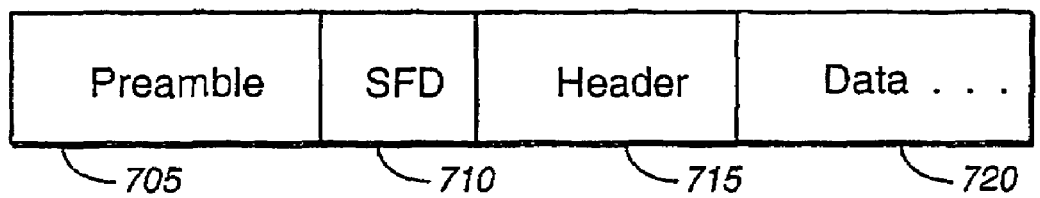
FIG._7

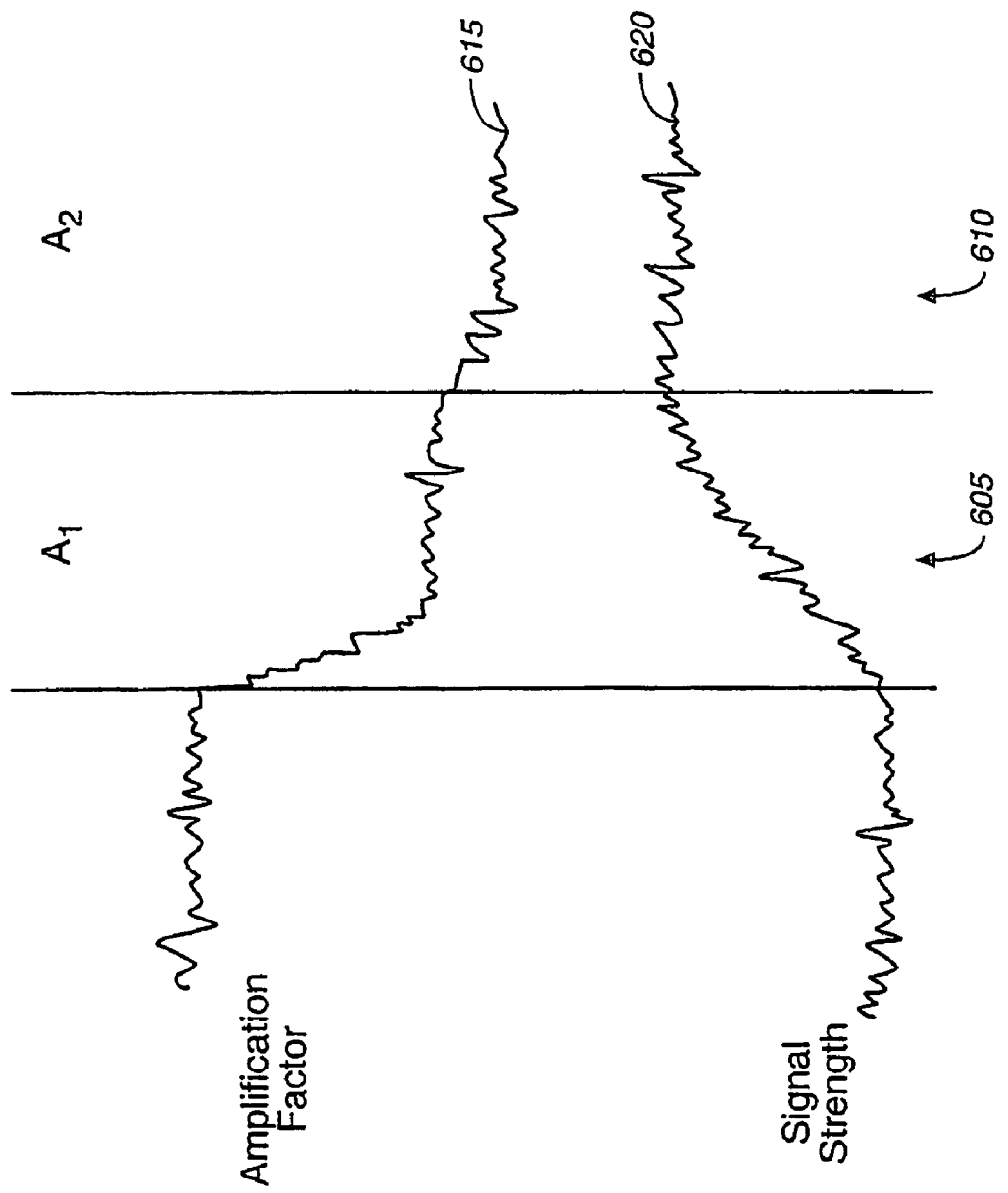
FIG._6

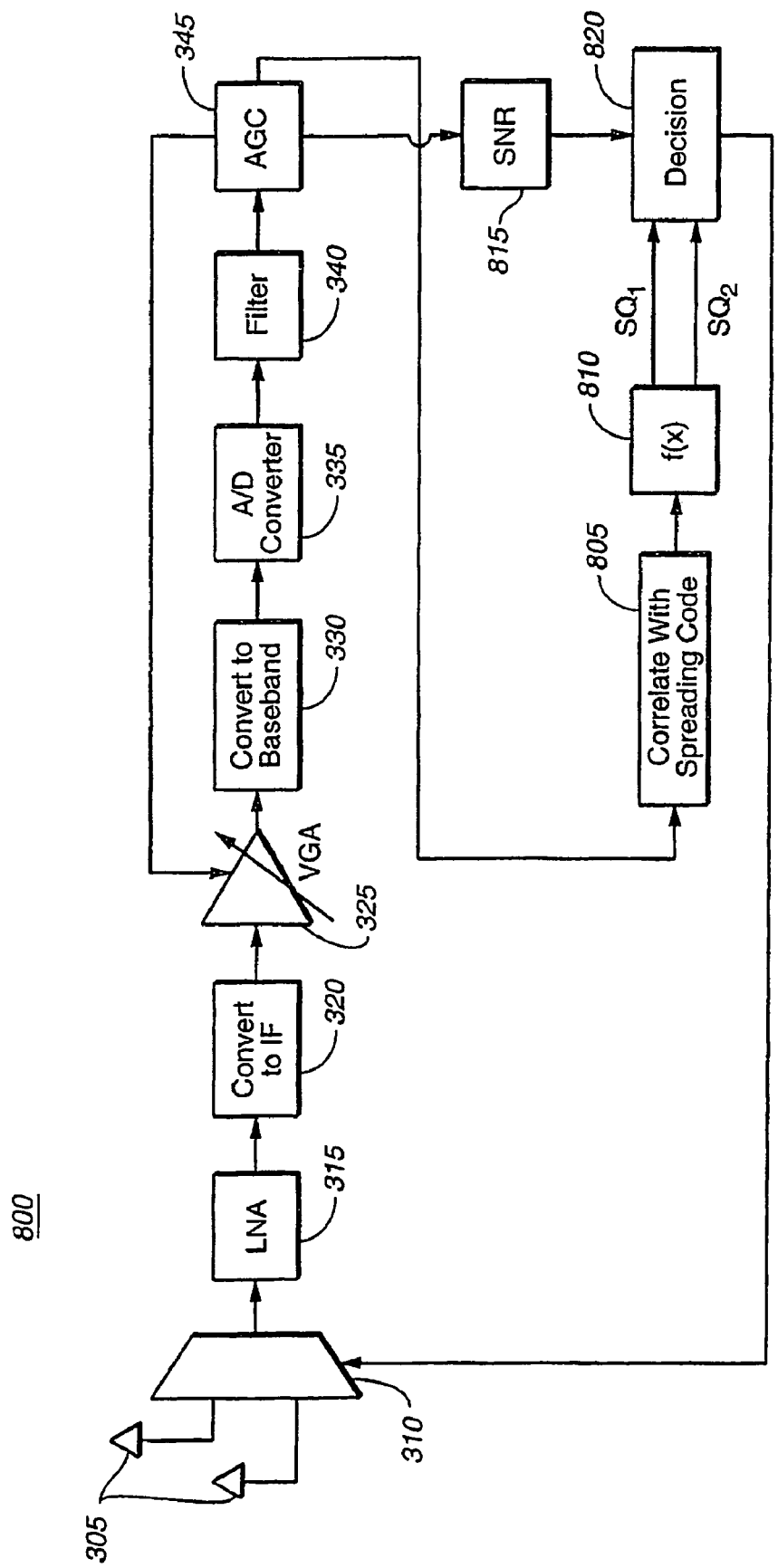
FIG._8

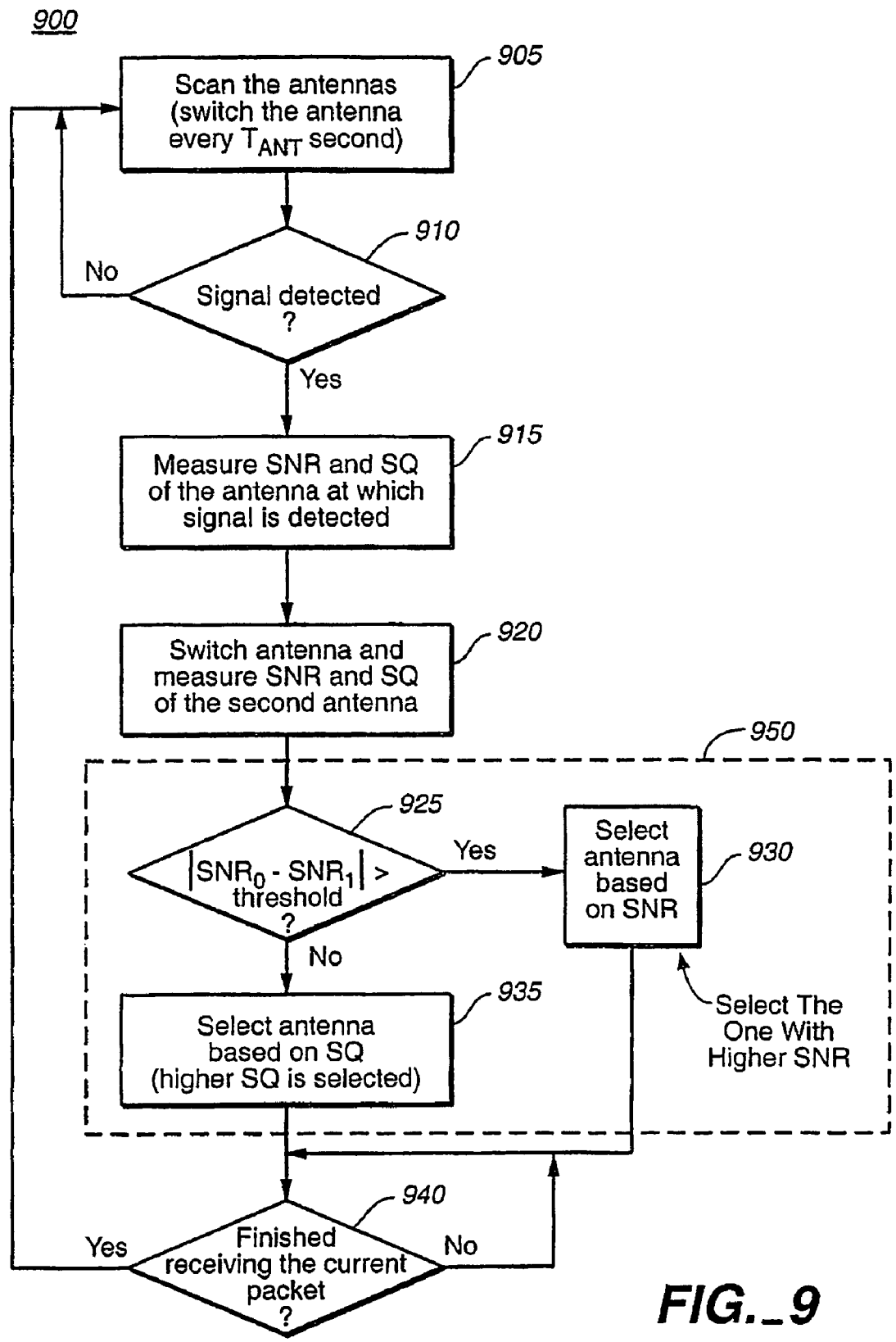
FIG._9

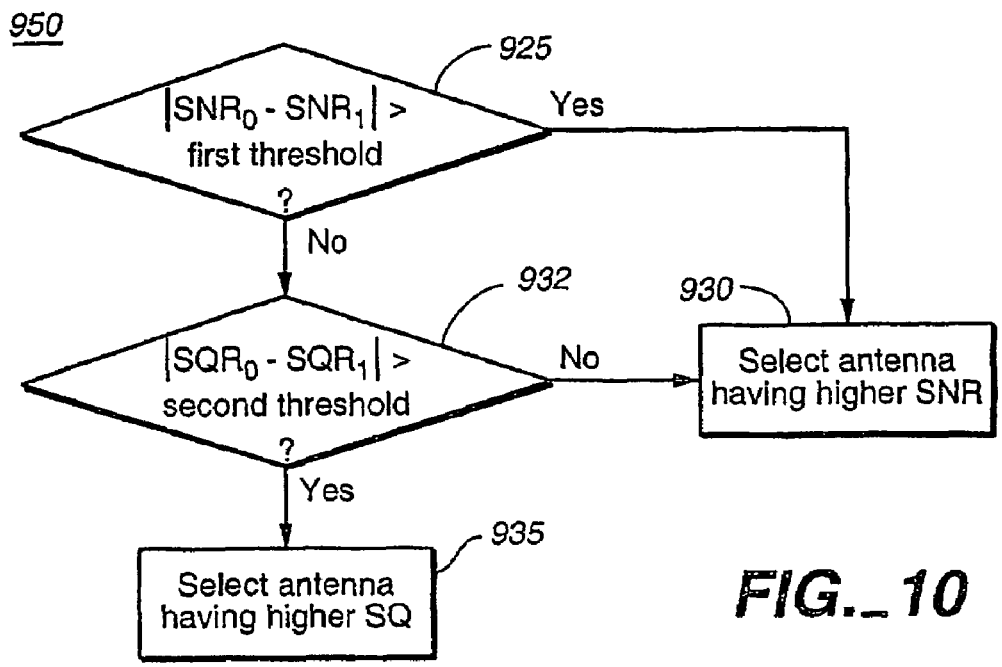
FIG._10
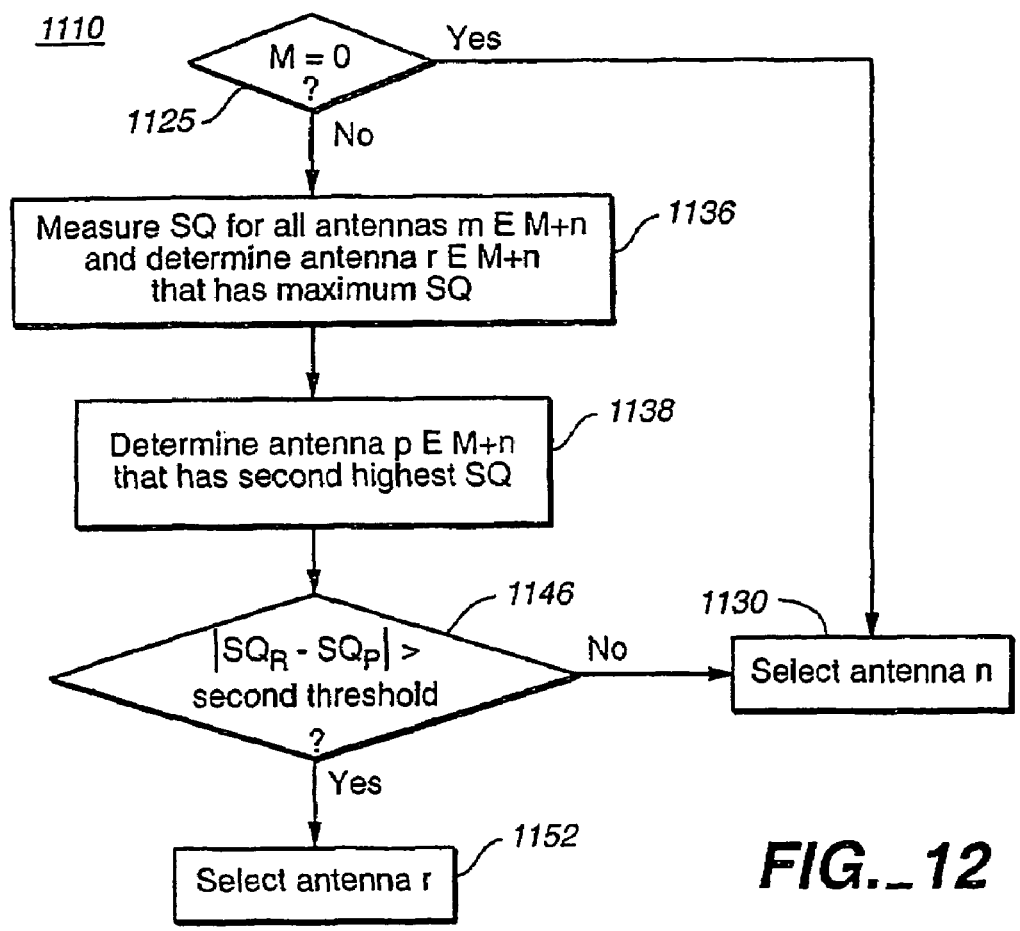
FIG._12

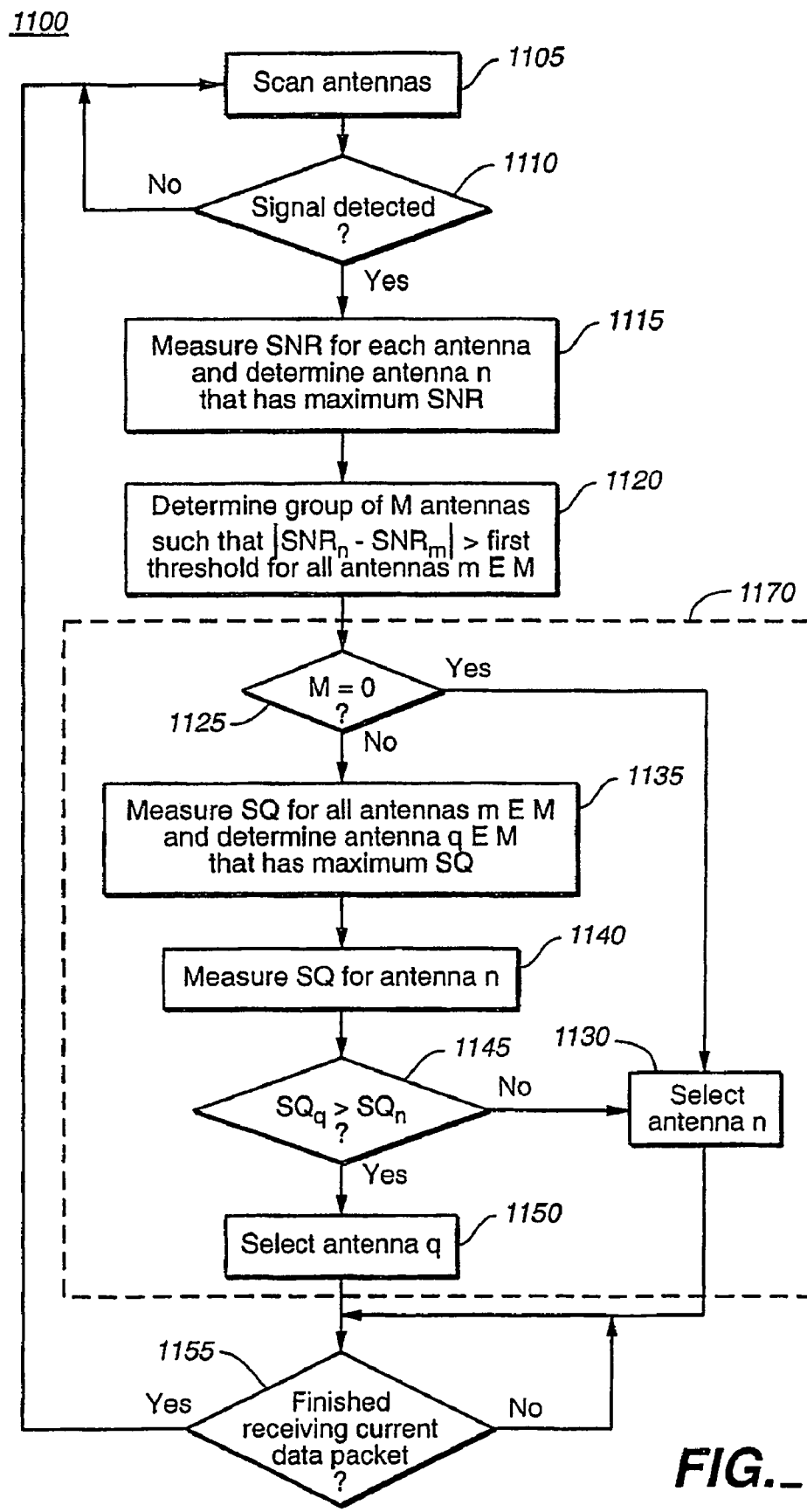
FIG._11

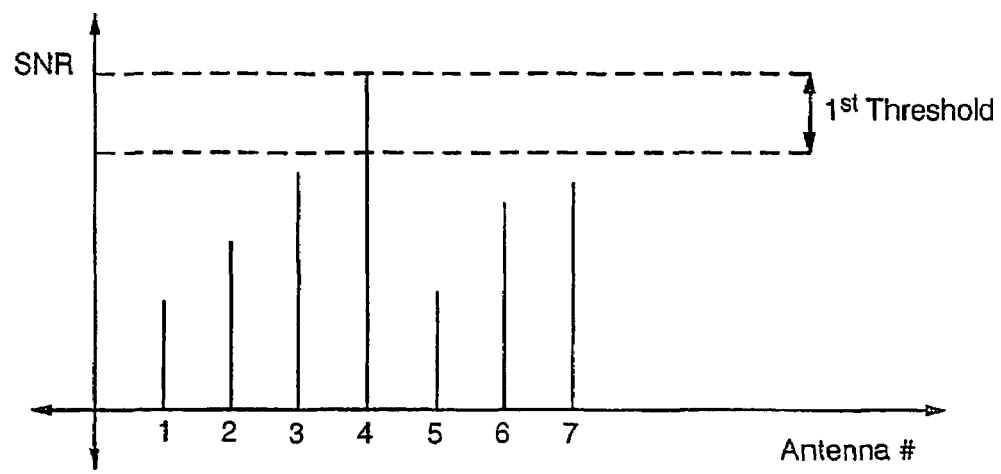
FIG._13
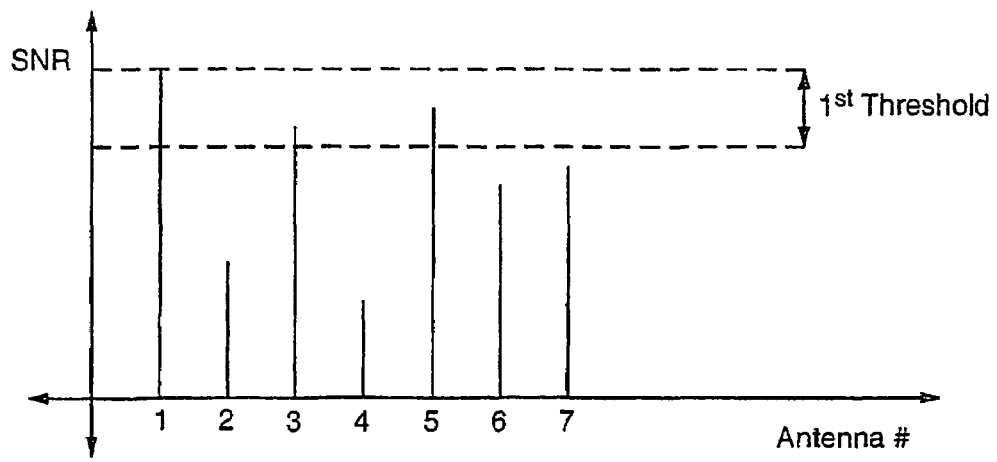
FIG._14
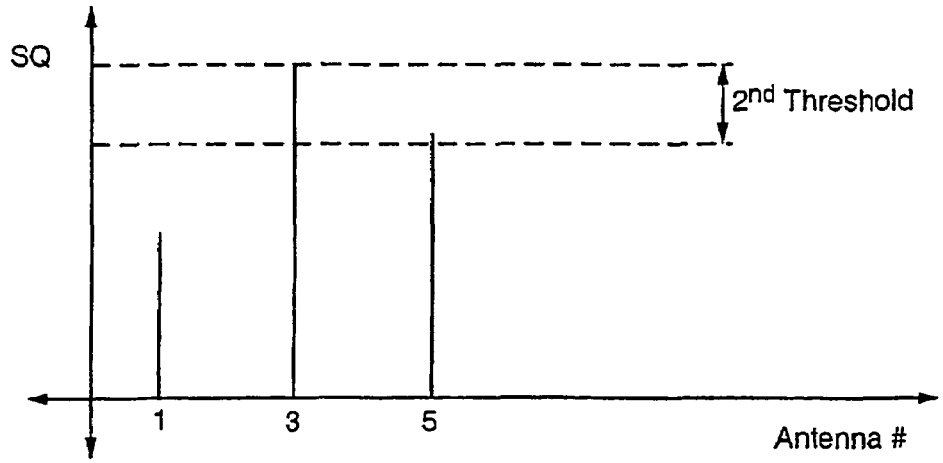
FIG._15

ANTENNA DIVERSITY TECHNIQUE FOR WIRELESS COMMUNICATION

CROSS-REFERENCE TO RELATED APPLICATIONS

This application is a continuation of U.S. patent application Ser. No. 11/449,956, now U.S. Pat. No. 7,421,012, filed Jun. 9, 2006, which is a continuation of U.S. patent application Ser. No. 09/991,473, now U.S. Pat. No. 7,099,380, filed Nov. 16, 2001. The disclosures of the above patents are incorporated herein by reference.

FIELD OF THE INVENTION

The present invention relates to a technique for using antenna diversity for wireless communication in a multipath signal environment, and more particularly to a technique for assessing channel quality based on multipath-related factors.

DESCRIPTION OF THE RELATED ART

Signal environments that include noise and/or interference present a problem for communication systems that has been addressed using many techniques, including signal amplification, signal encoding, filtering by frequency range, and spread-spectrum modulation. Another technique that has been often used is that of antenna diversity. Referring to FIG. 1, in a communication system 100 that uses antenna diversity, at least two separate antennas 105, 110 are used as inputs to a single receiver system 115. For each data packet, the receiver 115 is designed to select which antenna input is providing the best signal reception for each data packet. Antenna diversity is most useful when operating in a wireless communication system, such as a system that uses radio communication techniques.

Antenna diversity techniques for signal reception in noisy environments and interference environments are very well known in the literature and are the subject of many patents. For example, see U.S. Pat. Nos. 5,077,753; 5,838,742; 6,061,574; 6,115,406; 6,215,812; 6,215,814; 6,229,842; 6,240,149; 6,256,340; 6,259,721; and 6,278,726, and European Patent Office Publication Number 0 642 243 A1, the contents of each of which are incorporated herein by reference.

Referring again to FIG. 1, one type of interference that is often encountered in communication systems is know as multipath interference. Multipath interference occurs when a signal propagates by more than one path between the transmitter 120 and the receiver 115. For example, a signal may propagate directly by line-of-sight along paths 125 between the transmitter 120 and the receiver 115, and it may also "bounce" off of the ground or some other reflective object en route along path 130 between the transmitter 120 and the receiver 115. When a signal arrives at a receiver after traveling by two or more paths, interference occurs because of the different path lengths, which causes the transmission time to differ and thus leads to the two or more separate reception of the signal to interfere with each other. Furthermore, even if the receiver is designed to filter out other signals based on frequency or coding or modulation, the receiver will typically be unable to distinguish between the multiple receptions of the same signal, because the received signal is exactly the signal for which the receiver is tuned and ready to receive.

Referring to FIGS. 2 and 3, in many communication systems that use antenna diversity to counteract the effects of noise and interference, signal-to-noise ratio (SNR) is the quantity that is typically measured and used as the determinant in the selection of which antenna should be employed. For example, SNR may be determined by measuring the amount of gain applied by a variable-gain amplifier (VGA) to keep the circuit input constant. A gain level 205 applied to noise may be compared with a gain level 210 applied after the start of a data packet, and the SNR is measured by taking the ratio between the two gain levels 205, 210. As another example, a signal power level 215 may be measured and compared with a noise power level 220, and the signal-to-noise ratio may be computed by dividing the signal power level 215 by the noise power level 220 (or, if the power levels are expressed in decibels, by subtracting the noise level 220 from the signal level 215).

FIG. 3 shows a block diagram for a conventional communication system 300 designed to select an antenna from two or more antennas in an antenna diversity scheme by using the signal-to-noise ratio as the determinant. The system 300 includes at least two receive antennas 305 that feed the received analog signal into a multiplexer 310. The signal passes through a low noise amplifier 315 before its frequency is converted to an intermediate frequency IF by a converter 320. The signal is then processed by a variable-gain amplifier 325, then downconverted to the baseband frequency by converter 330. The analog signal is digitized by an A/D converter 335, then filtered by a filter 340 to remove signals outside its frequency range. Finally, the digital signal passes through an automatic gain controller 345, which effectively sets the signal level to a predetermined value and thereby measures the SNR. The predetermined value is set by using a control signal with a known amplitude as a reference, so that the signal power at the input of the automatic gain controller (AGC) 345 remains constant. The control signal is generated by the AGC 345, and then fed back to the variable-gain amplifier (VGA) 325 to adjust the gain level of the VGA 325. Based on the measured SNR, an antenna selection is made by unit 350.

However, in a multipath signal environment, the system performance may depend more upon characteristics related to the multipath nature of the environment than upon the SNR, especially because SNR is generally not a reliable indicator of multipath effects. Hence, to optimize system performance, multipath factors must be taken into account. Accordingly, there is a need for a new method of selecting a receive antenna in an antenna diversity system when operating in a multipath signal environment.

SUMMARY OF THE INVENTION

The present invention is intended to address the need for an improved method for selecting an antenna in an antenna diversity system for wireless communications in multipath signal environments.

In one aspect, the invention provides a communication system for communicating data packets. The system includes a receiver subsystem. The receiver subsystem includes a first antenna, a second antenna, a spread-spectrum modulator, and a signal quality measurement device. The device is configured to measure signal quality values corresponding to each of the first and second antennas for each data packet and to select an antenna on the basis of the measurements. The communication system may also include an analog-to-digital converter, a filter, and an automatic gain control unit. The analog-to-digital converter may be configured to extract a predetermined number of sample values from each incoming data packet. The signal quality measurement device may be configured to measure signal quality values other than SNR by computing peak-to-average ratio values by dividing a peak sample value by an average sample value, where the average sample value is determined by averaging all of the predetermined number of sample values for each incoming spreading codeword, and the peak sample value being determined by selecting the maximum of all of the predetermined number of sample values for each incoming spreading codeword. The spread-spectrum modulator may be configured to employ direct sequence spread spectrum modulation, such as an eleven-chip Barker code modulation. The communication system may conform to either an IEEE 802.11 standard specification or an IEEE 802.11(b) standard specification.

In another aspect, the invention provides an antenna array designed to provide antenna diversity to a communication system. The array includes at least two antennas. The system includes a spread-spectrum modulator and a signal quality measurement device, and the system is configured to receive data packets. The signal quality measurement device is configured to measure signal quality values corresponding to each of the at least two antennas for each data packet and to select an antenna on the basis of the measurements. The communication system may also include an analog-to-digital converter, a filter, and an automatic gain control unit. The analog-to-digital converter may be configured to extract a predetermined number of sample values from each incoming data packet. The signal quality measurement device may be configured to measure signal quality values by computing peak-to-average ratio values by dividing a peak sample value by an average sample value, where the average sample value is determined by averaging all of the predetermined number of sample values for each incoming spreading codeword, and the peak sample value is determined by selecting the maximum of all of the predetermined number of sample values for each incoming spreading codeword. The spread-spectrum modulator may be configured to employ direct sequence spread spectrum modulation, such as an eleven-chip Barker code. The communication system may also conform to either an IEEE 802.11 standard specification or an IEEE 802.11(b) standard specification.

In yet another aspect, a method and an apparatus for selecting an antenna from an antenna diversity array in a communication system are provided. The antenna diversity array includes at least two antennas. The method includes the steps of modulating an incoming signal with a spread-spectrum type modulation, measuring a signal quality value for each antenna in the antenna diversity array, and selecting an antenna from the antenna diversity array on the basis of the measured signal quality values. The communication system may include an analog-to-digital converter, a filter, and an automatic gain control device. The analog-to-digital converter may be configured to extract a predetermined number of sample values from each of a plurality of incoming signal packets. The step of measuring a signal quality value for each antenna may include computing peak-to-average ratio values by dividing a peak sample value by an average sample value, where the average sample value is determined by averaging all of the predetermined number of sample values for each of the plurality of incoming spreading codewords, and the peak sample value is determined by selecting the maximum of all of the predetermined number of sample values for each of the plurality of incoming spreading codewords. The step of modulating may include employing direct sequence spread spectrum modulation, such as an eleven-chip Barker code. The communication system may conform to either an IEEE 802.11 standard specification or an IEEE 802.11(b) standard specification.

In still another aspect, a method and an apparatus for improving reliability in a communication system when operating in a multipath signal environment are provided. The communication system includes an antenna diversity array having at least two antennas. The method includes the steps of modulating an incoming signal with a spread-spectrum type modulation, measuring a signal quality value for each antenna in the antenna diversity array, and selecting an antenna from the antenna diversity array on the basis of the measured signal quality values. The communication system may include an analog-to-digital converter, a filter, and an automatic gain control device. The analog-to-digital converter may be configured to extract a predetermined number of sample values from each of a plurality of incoming signal packets. The step of measuring a signal quality value for each antenna may include computing peak-to-average ratio values by dividing a peak sample value by an average sample value, where the average sample value is determined by averaging all of the predetermined number of sample values for each of the plurality of incoming spreading codewords, and the peak sample value is determined by selecting the maximum of all of the predetermined number of sample values for each of the plurality of incoming spreading codewords. The step of modulating may include employing direct sequence spread spectrum modulation, such as an eleven-chip Barker code. The communication system may conform to either an IEEE 802.11 standard specification or an IEEE 802.11(b) standard specification.

In yet another aspect, a method and an apparatus for mitigating intersymbol interference in a communication system operating in a multipath environment are provided. The communication system includes an antenna diversity array having at least two antennas. The antenna diversity array includes at least two antennas. The method includes the steps of modulating an incoming signal with a spread-spectrum type modulation, measuring a signal quality value for each antenna in the antenna diversity array, and selecting an antenna from the antenna diversity array on the basis of the measured signal quality values. The communication system may include an analog-to-digital converter, a filter, and an automatic gain control device. The analog-to-digital converter may be configured to extract a predetermined number of sample values from each of a plurality of incoming signal packets. The step of measuring a signal quality value for each antenna may include computing peak-to-average ratio values by dividing a peak sample value by an average sample value, where the average sample value is determined by averaging all of the predetermined number of sample values for each of the plurality of incoming spreading codewords, and the peak sample value is determined by selecting the maximum of all of the predetermined number of sample values for each of the plurality of incoming spreading codewords. The step of modulating may include employing direct sequence spread spectrum modulation, such as an eleven-chip Barker code. The communication system may conform to either an IEEE 802.11 standard specification or an IEEE 802.11(b) standard specification.

In still another aspect, the invention provides a storage medium for storing software for implementing each of the methods described above. The software is computer-readable.

BRIEF DESCRIPTION OF THE DRAWINGS

FIG. 1 illustrates a communication system that uses antenna diversity to mitigate noise and interference.

FIG. 2 illustrates a measurement of signal-to-noise ratio for a signal propagating in a noisy environment.

FIG. 3 shows a block diagram of a conventional communication system that uses signal-to-noise ratio to select an antenna for signal reception.

FIG. 4 shows an idealized digital signal after despreading in an environment having no noise and no interference.

FIG. 5 shows a sampled digital symbol in a multipath signal environment after despreading.

FIG. 6 illustrates a signal propagating in a multipath environment and being received by two antennas in an antenna diversity system, and measuring a signal quality parameter according to the present invention.

FIG. 7 shows a data format for an exemplary signal packet.

FIG. 8 shows a block diagram of an antenna diversity system that computes a signal quality parameter to be used in selecting an antenna for reception, according to the present invention.

FIG. 9 shows a flow chart that illustrates first algorithm for selecting an antenna for reception in an antenna diversity system having two antennas, according to the present invention.

FIG. 10 shows a flow chart that illustrates a second algorithm for selecting an antenna for reception in an antenna diversity system having two antennas, according to the present invention.

FIG. 11 shows a flow chart that illustrates a process using the first algorithm for selecting an antenna for reception in an antenna diversity system having more than two antennas, according to the present invention.

FIG. 12 shows a flow chart that illustrates a process using the second algorithm for selecting an antenna for reception in an antenna diversity system having more than two antennas, according to the present invention.

FIGS. 13 and 14 show two graphs of signal-to-noise ratios for each antenna in an exemplary seven-antenna diversity array.

FIG. 15 shows a graph of signal quality values for each antenna for which the signal-to-noise ratio was within a threshold value of the maximum in FIG. 14.

DETAILED DESCRIPTION OF THE INVENTION

The present inventors have recognized that in a multipath signal environment, the system performance may depend more upon characteristics related to the multipath nature of the environment than upon the SNR. Hence, to optimize system performance, multipath factors must be taken into account. Accordingly, the present invention provides a new method of selecting a receive antenna in an antenna diversity system for wireless communications which is based upon a signal quality measurement that depends primarily on multipath-related factors.

Referring to FIG. 4, a sequence of three digital symbols is shown as it would appear after de-spreading in a signal environment having no noise and no interference, including no interference induced by multipath effects. Referring to FIG. 5, an exemplary sampled digital symbol that has been affected by multipath is shown. It may be observed that the digital symbol appears to be spread out and less clearly distinguishable as a +1. This effect can cause intersymbol interference with subsequent (or prior) transmitted symbols.

The inventive technique involves the use of a direct sequence spread spectrum (DSSS) type of modulation. DSSS modulations use a "spreading" code, such as an 11-chip Barker code, to effectively spread the spectrum of the data. The 11-chip Barker code has a very good autocorrelation property, and is generally a preferred direct sequence spread spectrum modulation in the header. This property enables the data to be recovered at very low error rates in multipath environments. The 11-chip Barker code is as follows:

[+ − + + − + + + − − −]

The technique is applicable for oversampled or non-oversampled systems. In one oversampling example, each symbol is sampled 22 times. The magnitudes of the $i^{th}$ sample may be designated as $y_i$. The sample having the largest magnitude, either positive or negative, is designated the "peak" value $y_{peak}$; for example, referring again to FIG. 5, the peak 505 is represented by the sample that most closely approximates the maximum value for that symbol.

A signal quality ("SQ") measurement may be computed using Equation 1 below:

$$SQ_j = \left( \frac{|y_{peak}|}{\left|\sum_{i=0}^{N} y_i - 2y_{peak}\right|} \right)$$

where N=the number of samples and $SQ_j$=the signal quality measurement for the $j^{th}$ antenna. Equation 1 defines a measurement of a peak-to-average ratio within a given data symbol, rather than a signal-to-noise ratio. Hence, the peak-to-average ratio, as formulated above, is much more effective at dealing with the intersymbol interference that is a likely result of a multipath signal environment. The operation of Equation 1 above is carried out for each incoming spreading codeword in a prescribed period of time during the preamble of each data packet for all antennas in the antenna diversity array. Then, an antenna is selected based on either SQ, SNR, or both SQ and SNR.

Referring to FIG. 6, two illustrations of a signal propagating in a multipath environment and being received by two antennas in an antenna diversity array is shown. The top illustration 615 corresponds to an amplification factor as applied by the VGA, and the bottom illustration 620 corresponds to a signal strength measurement. The region 605 corresponds to the signal as received by the first antenna $A_1$, and the second region 610 corresponds to the signal as received by the second antenna $A_2$. A signal quality measurement is taken for each of the two antennas, according to Equation 1 above. In FIG. 6, the antenna $A_2$ appears to have a higher SNR, but $A_2$ may or may not be the antenna to be selected.

Referring to FIG. 7, a data packet format of a typical signal is shown. The first portion 705 of the packet is a preamble, which includes a known data pattern. The fact that the data pattern is known in advance allows the system to perform several functions, including synchronization, carrier acquisition, timing acquisition, and antenna selection. A typical duration for a long preamble may be approximately 128 µs; for a short preamble, it may be approximately 56 µs. The second portion 710 of the packet is a sync frame delimiter, which simply defines the end of the preamble. The third portion 715 is a header, which includes information about the data in the packet itself, such as the modulation being employed (e.g., Barker code modulation versus some other DSSS modulation) and the data rate. Typical data rates for Barker code modulation are 1 Mb/s and 2 Mb/s. The header may also include a cyclic redundancy check (CRC) as a method of error detection. Finally, the last portion 720 of the packet is the actual data.

Referring to FIG. 8, a block diagram is shown for a wireless communication system 800 that implements the signal quality measurement for selecting an antenna from an antenna diversity array in a multipath environment. The system 800 has differences as compared to the conventional system 300 shown in FIG. 3. The system 800 takes the output signal of the system 300 and performs two additional functions: First, the signal passes through a spread-spectrum correlator 805 that correlates the preamble of a data packet with the spreading code. The correlator 805 may include a demodulator. Then, the signal quality measurement is taken for each antenna in the diversity array in the processor 810. The processor 810 acts as a hardware implementation of the formula shown in Equation 1 above. The two outputs correspond to the signal quality measurements for the two antennas. If the diversity array has more than two antennas, then the number of outputs is equal to the number of antennas in the array. Two specific applications for the antenna diversity selection method defined by this invention are the IEEE 802.11 WLAN communication system and the IEEE 802.11(b) WLAN communication system, the specifications for each of which are incorporated herein by reference.

In a preferred embodiment, the antenna selection method uses both SNR measurements and signal quality measurements to choose an antenna on a packet-by-packet basis. The output of the AGC 345 is sent through the spreading-code correlator 805 and the signal quality measurement processor 810, but it is also sent through an SNR measurement processor 815. When the measured SNR at a first antenna is significantly greater than the measured SNR at a second antenna, the antenna selection may be made at decision unit 820 on the basis of this difference, and the first antenna is selected. When the difference in SNR between the first and second antennas is less than a prescribed threshold, the signal quality measurements may be used by decision unit 820 to determine which antenna will provide superior performance for that data packet, and the antenna with the highest signal quality value is selected.

Referring to FIG. 9, a flow chart illustrates a first algorithm used in the antenna diversity selection method of the present invention. In FIG. 9, it is assumed that the antenna diversity system includes exactly two antennas. First, at step 905, the antennas are scanning to determine whether an incoming signal is present. At step 910, a signal is detected by one of the antennas. At step 915, the SNR and signal quality are measured for the antenna that has detected the signal. At step 920, the SNR and signal quality are measured for the other antenna (i.e., the antenna that did not originally detect the signal at step 910). At step 925, the SNR values measured for the two antennas are compared. If the difference between the two SNR values exceeds a predetermined threshold, then the process continues to step 930, and the antenna corresponding to the greater SNR is selected. On the other hand, if at step 925 the difference between the two SNR values does not exceed the predetermined threshold, then the process continues to step 935, and the antenna corresponding to the greater signal quality measurement is selected. In either case, the next step is step 940, at which a determination is made as to whether a full data packet has been received. If not, the process simply holds until the full data packet has been received. Once the full data packet has been received, the process returns to the beginning at step 905.

The threshold value may be programmable or selectable by a system operator. Typically, it is expected that the usual scenario will require the use of the signal quality measurements as the determining factor in selecting an antenna, because the SNR usually does not vary greatly from one antenna to the other. However, if the threshold value chosen is low, then the SNR may still be used often as the determining factor. Regardless of whether SNR or signal quality is used to select an antenna, the process is restarted for each new incoming data packet.

In an alternative embodiment, a second algorithm may be used. Referring again to FIG. 9, the portion 950 of the figure included within the dotted line may be replaced by the steps shown in FIG. 10. As in the first algorithm, at step 925, an SNR difference as compared to a first threshold is computed, and if the SNR difference is less than the first threshold, the antenna having the greater SNR is selected at step 930. However, before proceeding to step 935, an additional step 932 is performed by comparing a difference in the signal quality values for the two antennas to a second threshold. If the difference between the two signal quality values is less than the second threshold, then the antenna having the higher SNR is selected at step 930; but if the difference between the two signal quality values is greater than the second threshold, then the antenna having the higher signal quality value is selected. In this alternative, SNR may be used to select an antenna if either the SNR difference exceeds the first threshold or if the signal quality difference is less than the second threshold. In this manner, it is recognized that in some circumstances, the signal quality measurement may not draw a definitive distinction between the two receive antennas, in which case it may be preferable to use the conventional SNR determination. Of course, if it is true that both the SNR difference is less than the first threshold and the signal quality difference is greater than the second threshold, the signal quality measurement will be used to make an antenna selection.

The two algorithms illustrated in FIGS. 9 and 10 may be extended for use in antenna diversity systems having more than two antennas, as illustrated in FIGS. 11 and 12, respectively. Referring to FIG. 11, first, at step 1105, the antennas are scanning to determine whether an incoming signal is present. At step 1110, a signal is detected by one of the antennas. At step 1115, the SNR is measured for each antenna, and a determination is made as to which antenna corresponds to the maximum SNR. This antenna is referred to as Antenna n, or the $n^{th}$ antenna. At step 1120, a group of M antennas for which the SNR is within a first threshold of the SNR of Antenna n is determined. At step 1125, if M=0, then Antenna n is selected at step 1130. In this manner, the antenna having the maximum SNR is always selected when its SNR exceeds the SNRs of all other antennas by a significant margin.

If M is at least one, then at step 1135, the signal quality values are measured for all of the M antennas, and a determination is made as to which of these antennas corresponds to the maximum signal quality value. This antenna is referred to as Antenna q, or the $q^{th}$ antenna. The signal quality value for Antenna n is also measured at step 1140. At step 1145, the signal quality values of Antenna n and Antenna q are compared. If the signal quality value of Antenna n is greater than that of Antenna q, then Antenna n is selected at step 1140. On the other hand, if the signal quality value of Antenna q is greater than that of Antenna n, then Antenna q is selected at step 1150. At step 1155, the process holds until the entire data packet has been received, then the process returns to the beginning at step 1105.

An extension of the second algorithm to the case of an antenna diversity system having more than two antennas is illustrated in FIG. 12. Referring again to FIG. 11, the portion 1170 of the figure included within the dotted line may be replaced by the steps shown in FIG. 12. As in the first algorithm, at step 1125, if it is determined that the difference between the SNR of Antenna n and the SNR of each of the other antennas is greater than the first threshold (i.e., M=0), then Antenna n is selected at step 1130. If M is at least one, then at step 1136, the signal quality values are measured for all of the M antennas and Antenna n, and a determination is made as to which of these antennas corresponds to the maximum signal quality value. This antenna is referred to as Antenna r, or the $r^{th}$ antenna. The next step, step 1138, determines which of the group of M antennas and Antenna n corresponds to the second-highest signal quality value. This antenna is referred to as Antenna p, or the $p^{th}$ antenna. At step 1146, the difference between the signal quality values of Antenna r and Antenna p is computed and then compared to a second threshold value. If this difference is less than the second threshold value, then Antenna n is selected at step 1130. On the other hand, if the signal quality value of Antenna r exceeds the signal quality values of Antenna p by more than the second threshold, then Antenna r is selected at step 1152.

Referring to FIGS. 13, 14, and 15, the two algorithms described above are illustrated for an exemplary antenna diversity array having seven antennas. In FIG. 13, Antenna 4 corresponds to the maximum SNR, and the first threshold value is illustrated by the dotted lines. In FIG. 13, none of the other six antennas in the array corresponds to an SNR that falls within the threshold region. Thus, in this case, Antenna 4 will be selected by both algorithms, and the signal quality values will not be used for the antenna selection.

Referring to FIG. 14, Antenna 1 corresponds to the maximum SNR, and Antenna 3 and Antenna 5 also correspond to SNRs that fall within the threshold region. Therefore, in this case, the signal quality values will be measured for Antennas 1, 3, and 5, as shown in FIG. 15. Antennas 2, 4, 6, and 7 are effectively eliminated from the selection process because their SNR values do not fall within the threshold region.

Referring to FIG. 15, Antenna 3 corresponds to the maximum signal quality value, and Antenna 5 corresponds to the second-highest signal quality value. As described above, when the first algorithm is being employed (i.e., see FIG. 11), the antenna having the maximum signal quality value of those falling within the threshold region for SNR is chosen. Therefore, in the case illustrated in FIG. 15, Antenna 3 will be selected when the first algorithm is being employed.

When the second algorithm is being employed, as described above with reference to FIG. 12, a second threshold region is applied, and if the second-highest signal quality value is within the second threshold region, then the antenna having the maximum SNR is selected. In the case illustrated in FIG. 15, the signal quality value for Antenna 5 does fall within the second threshold region. Therefore, when the second algorithm is employed, the antenna having the maximum SNR, i.e., Antenna 1, will be selected. In this manner, it is recognized that in these circumstances, the signal quality measurement may not draw a definitive distinction between the receive antennas (i.e., Antennas 1, 3 and 5), in which case it may be preferable to use the conventional SNR determination.

The equation used for calculating signal quality, Equation 1 above, may be specified more exactly to correspond to the non-oversampled case and the oversampled case, respectively. Supposing that an N-chip spreading code is used and a non-oversampled system is being employed, there will be one sample for each chip, thus N samples for each symbol, which may be represented as $(y_0, y_1, \ldots, y_{N-1})$. Let p denote the index of the sample corresponding to the value having the peak magnitude; hence, $|y_p|=\max_i |y_i|$. Then, for any arbitrary values of L and M, the signal quality measurement equation may be expressed as follows (Equation 2):

$$SQ = \left( \frac{|y_p|}{\sum_{i=1}^{L} (|y_{p-M-i}| + |y_{p+M+i}|)} \right)$$

where the index arithmetic is performed modulo N, i.e., $y_{p-M-i} = y_{(p-M-i) \bmod N}$ and $y_{p+M+i} = y_{(p+M+i) \bmod N}$.

As an example of an oversampled system using an N-chip spreading code, suppose that 2N samples are taken for each symbol; therefore, the symbol may be represented as $(y_0, y_1, \ldots, y_{2N-1})$. Again, let p denote the index of the sample corresponding to the value having the peak magnitude; hence, $|y_p|=\max_i |y_i|$. Then, for any arbitrary values of L and M, the signal quality measurement equation may be expressed as follows (Equation 3):

$$SQ = \left( \frac{|y_p|}{\sum_{i=1}^{L} (|y_{p-M-i}| + |y_{p+M+i}|)} \right)$$

where the index arithmetic is performed modulo 2N, i.e., $y_{p-M-i} = y_{(p-M-i) \bmod 2N}$ and $y_{p+M+i} = y_{(p+M+i) \bmod 2N}$. It is noted that the case of the oversampled system is preferred.

The signal quality measurement formula may also be modified by using a moving average of signal quality calculations, which may be effected by simply adding several signal quality measurements together. The technique of using the signal quality measurement may also be applied to antenna diversity systems using more than two antennas, for example, three-antenna systems, four-antenna systems, or larger antenna arrays. Various implementations of the technique of using the signal quality measurement to select an antenna may be used. Such implementations include systems having appropriate circuitry, methods of using communication system circuitry, and storage media having software that includes instructions for causing a computer to execute the signal quality measurement technique.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. For example, it is to be understood that although a preferred embodiment uses the IEEE 802.11(b) WLAN with the 11-chip Barker code, the invention is applicable to other wireless communications systems that use other types of spreading codes and direct sequence spread-spectrum modulations. The scope of the following claims is to be accorded the broadest interpretation so as to encompass all such modifications and equivalent structures and functions.

What is claimed is:

1. A receiver comprising:
   a demodulator that receives data packets each having a preamble and that generates spreading codewords by correlating a spreading code with the preambles of the data packets; and
   a signal quality device that determines signal quality values at a plurality of antennas for each of the data packets after correlation with corresponding ones of the spreading codes and that selects one of the plurality of antennas based on the signal quality values, wherein each of the signal quality values includes a peak-to-average ratio value.

2. The receiver of claim 1, wherein each of the spreading codes includes a predetermined number of chips.

3. The receiver of claim 1, wherein the signal quality device computes the peak-to-average ratio value by dividing a peak sample value of a predetermined number of sample values by an average sample value of the predetermined number of sample values.

4. The receiver of claim 2, wherein the predetermined number of chips in the spreading code is equal to a predetermined number of sample values for each of the spreading codewords.

5. The receiver of claim 4, wherein:
the signal quality values are based on a peak sample value and an average sample value;
N is the predetermined number of sample values for each spreading codeword;
an index k corresponds to the $k^{th}$ sample within a sequence of the N sample values for each spreading codeword, wherein k is computed using modulo-N arithmetic;
the peak sample value is based on a maximum of the N sample values for each of the spreading codewords;
an index p indicates the sample corresponding to the peak sample value;
a value corresponding to a symmetric pair of samples is determined by adding values corresponding to the samples having indices k=p−i and k=p+i for a differential index i; and
the average sample value is based on an arbitrary number of values corresponding to symmetric pairs of samples.

6. The receiver of claim 2, wherein a predetermined number of sample values for each spreading codeword is greater than the predetermined number of chips in the spreading code.

7. The receiver of claim 6, wherein the predetermined number of sample values is equal to two times the predetermined number of chips in the spreading code.

8. The receiver of claim 7, wherein:
the signal quality values are based on a peak sample value and an average sample value;
2N is the predetermined number of sample values for each of the spreading codewords;
an index k corresponds to the $k^{th}$ sample within a sequence of the 2N sample values for each spreading codeword, wherein k is based on modulo-2N arithmetic;
the peak sample value is based on a maximum of the 2N sample values for each spreading codeword;
an index p indicates the sample corresponding to the peak sample value;
a value corresponding to a symmetric pair of samples is based on adding values corresponding to the samples having indices k=p−i and k=p+i for a differential index i; and
the average sample value is based on an arbitrary number of values corresponding to symmetric pairs of samples.

9. The receiver of claim 2, wherein each of the spreading codes comprises an eleven-chip Barker code.

10. The receiver of claim 1 wherein the demodulator comprises a direct sequence spread-spectrum demodulator.

11. A method comprising:
receiving data packets each including a preamble;
generating spreading codewords by correlating a spreading code with preambles of data packets;
determining signal quality values at a plurality of antennas for each of the data packets after correlation with corresponding ones of the spreading codes, wherein each of the signal quality values includes a peak-to-average ratio value; and
selecting one of the plurality of antennas based on the signal quality values.

12. The method of claim 11, wherein each of the spreading codes includes a predetermined number of chips.

13. The method of claim 11, further comprising:
determining the peak-to-average ratio value by dividing a peak sample value of a predetermined number of sample values by an average sample value of the predetermined number of sample values.

14. The method of claim 12, wherein the predetermined number of chips in the spreading code is equal to a predetermined number of sample values for each of the spreading codewords.

15. The method of claim 14, wherein:
the signal quality values are based on a peak sample value and an average sample value;
N is the predetermined number of sample values for each spreading codeword;
an index k corresponds to the $k^{th}$ sample within a sequence of the N sample values for each spreading codeword, wherein k is computed using modulo-N arithmetic;
the peak sample value is based on a maximum of the N sample values for each spreading codeword;
an index p indicates the sample corresponding to the peak sample value;
a value corresponding to a symmetric pair of samples is determined by adding values corresponding to the samples having indices k=p−i and k=p+i for a differential index i; and
the average sample value is based on an arbitrary number of values corresponding to symmetric pairs of samples.

16. The method of claim 12, wherein a predetermined number of sample values for each spreading codeword is greater than the predetermined number of chips in the spreading code.

17. The method of claim 16, wherein the predetermined number of sample values is equal to two times the predetermined number of chips in the spreading code.

18. The method of claim 17, wherein:
the signal quality values are based on a peak sample value and an average sample value;
2N is the predetermined number of sample values for each spreading codeword;
an index k corresponds to the $k^{th}$ sample within a chronological sequence of all of the 2N sample values for each spreading codeword, wherein k is based on modulo-2N arithmetic;
the peak sample value is based on a maximum of the 2N sample values for each spreading codeword;
an index p indicates the sample corresponding to the peak sample value;
a value corresponding to a symmetric pair of samples is based on adding values corresponding to the samples having indices k=p−i and k=p+i for a differential index i; and
the average sample value is based on an arbitrary number of values corresponding to symmetric pairs of samples.

19. The method of claim 12, wherein each of the spreading codes comprises an eleven-chip Barker code.

* * * * *